Feb. 22, 1966     D. COSTES     3,236,297
HEAT REMOVAL SYSTEM
Filed Aug. 6, 1962
FIG. 1
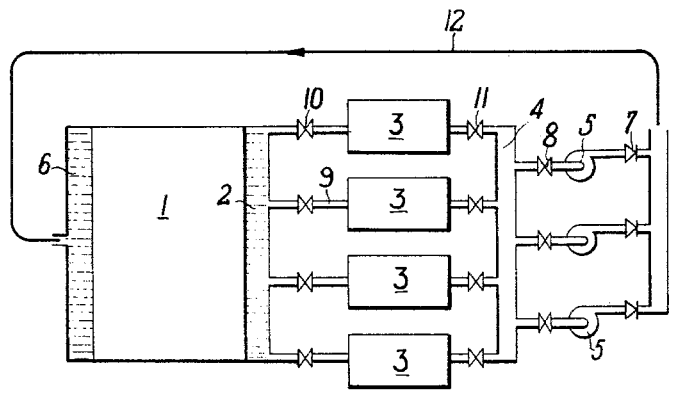
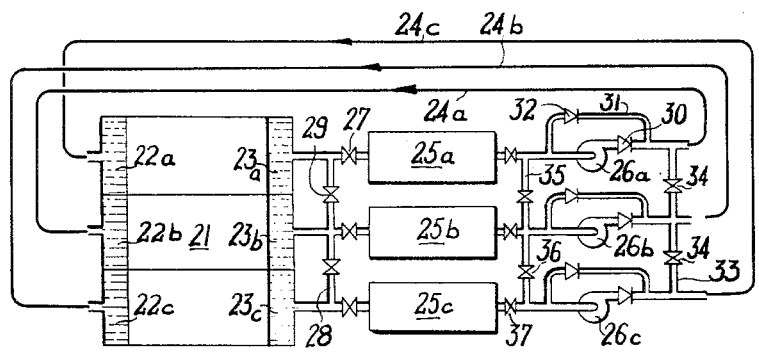
FIG. 2
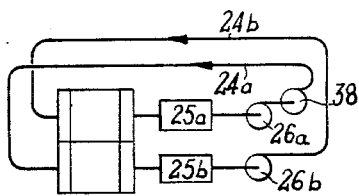
FIG. 3
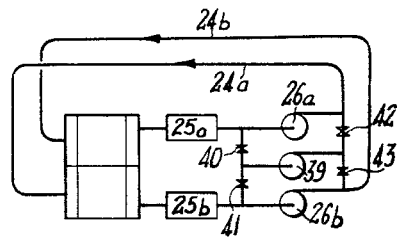
FIG. 4

United States Patent Office 3,236,297
Patented Feb. 22, 1966

3,236,297
HEAT REMOVAL SYSTEM
Didier Costes, Paris, France, assignor to Commissariat a l'Energie Atomique, Paris, France
Filed Aug. 6, 1962, Ser. No. 214,869
Claims priority, application France, Aug. 23, 1961, 871,405
6 Claims. (Cl. 165—107)

The heat supplied by a heat generator cannot always be used directly: it is generally transmitted to a utilisation device by a liquid flowing through a heat removal device.

This is, in particular, the case for the heat produced by power nuclear reactors. In the latter, the heat is extracted by a fluid flowing through the core of the said reactor and heated thereby, then passing into an exchanger where it is cooled by transmitting the recovered heat to a utilisation device, and then it subsequently flows back into the reactor.

The heat removal system generally comprises a relatively cold fluid collector which is kept at an approximately uniform temperature, by means of which the fluid enters the reactor core, a collector of hot fluid receiving the said fluid at the outlet from the core, heat exchangers transmitting the heat collected by the fluid to the utilisation circuit, and blowers or pumps circulating the fluid.

In such apparatus, it is known to connect the exchangers in parallel between the hot collector and the intermediate collector and the pumps or blowers are connected in parallel between this intermediate collector and the cold collector. In practice and as an economy measure, several exchangers are nevertheless frequently connected to the same blower without having a complete intermediate collector.

These conventional devices nevertheless have a serious drawback as they are not completely secure against accidental explosion of one of their members. Owing to the large connections connecting all similar members, then if a considerable leakage occurs in one zone, the fluid under pressure rapidly escapes; a chemical damage is considerable and, in the case of a nuclear reactor, the fluid remaining at a rapidly decreasing pressure may be inadequate to allow the nuclear reactor to cease operation without danger of overheating occurring, in particular with regard to the fuel.

The present invention provides a heat removal system wherein the leakage flow, occurring after a serious failure in one zone of the device under pressure, is reduced to a minimum.

According to the invention, a heat removal system for a heat generator comprises a plurality of first collectors for a cooling fluid at low temperature, a plurality of second collectors for a cooling fluid at high temperature, fluid flow conduit means within said heat generator each connecting one first collector to one second collector, heat exchanger means located outside of said heat generator for removing heat from said fluid, means for circulating fluid located downstream of each of said heat exchange means, and pipes connecting each second collector through at least one of said circulating means and a heat exchanger device, to a first collector which is different from that to which said second collector is connected through the generator.

In order that the invention may be more clearly understood, reference will now be made to the accompanying drawings which show certain embodiments thereof by way of example, compared with a known arrangement, and in which:

FIGURE 1 diagrammatically shows a heat removal system of a known type,

FIGURE 2 diagrammatically shows one embodiment of a heat removal system according to the invention, FIGURE 3 diagrammatically shows a further embodiment, and FIGURE 4 diagrammatically shows another embodiment of the invention.

Referring to the drawings, the known apparatus shown in FIGURE 1 comprises a heat generator 1 for example a nuclear reactor core, a collector 2 of hot fluid referred to as a "hot collector" adjacent the core 1 wherein a temperature equalisation is effected between the partial flows coming from the various pipes, heat exchangers 3 each connected to the collector 2 by a pipe 9, an intermediate collector 4 receiving the fluid at the outlet from the exchangers 3, blowers 5 controlling the circulation of the liquid and a collector 6 referred to as a "cold collector" for the relatively cold fluid returning to the reactor through a pipe 12. Each exchanger 3 is provided with an inlet valve 10 and an outlet valve 11, so that the collector may be isolated should there be a failure or the operation be abnormal.

The blowers 5 may also be isolated from the collector 4, if necessary, by means of valves 8. It becomes impossible for the fluid within the cold collector 6 to flow back to the blower 5 because of the presence of a non-return valve 7.

With devices of this known type, it is possible to isolate any exchangers or blowers which fail without thereby considerably modifying the operation of the assembly.

A drawback as regards security is nevertheless inherent in such devices. As a matter of fact when a leakage occurs at any given point along the pipes, all the fluid under pressure tends to leak out through collectors 2, 4 or 6, that is to say by comparatively direct paths having a large section. If the leakage is considerable the pressure in the generator rapidly drops; mechanical or heat damage may result and as well as considerable nuclear risks.

The heat removal system according to the invention eliminates or minimises the drawback and enables the leakage flow to be reduced to a minimum. As shown in FIGURE 2, the apparatus comprises, on either side of a heat generator 21, a plurality of "cold collectors" 22a, 22b, 22c . . . and a plurality of "hot collectors" 23a, 23b, 23c. . . . A first hot collector 23a is connected to a heat exchanger 25a and to a blower 26a then to a second cold collector 22b by a conduit 24a.

In the same manner, the conduit 24b connects the hot collector 23b, an exchanger 25b and a blower 26b, back to the cold collector 22c and so on until the fluid flows back to the first cold collector 22a.

The conduits 24a, 24b, 24c are each provided with a valve 27 upstream of the exchangers 25a, 25b, 25c. A conduit 28 provided with valves 29 which are normally closed, is arranged between this valve and the hot collectors and interconnects the pipes. Each exchanger may thus be isolated from the general circuit while the pipes connected to those of one or more other exchangers may be connected up. The outlet of each blower 26a, 26b, 26c is provided with a non-return valve 30. A bypass conduit 31 provided with an automatic valve 32 is located in parallel with each blower 26. Downstream of each of the latter, a conduit 33 provided with valves 34 which are normally closed, connects the pipes 24a, 24b and 24c and makes it possible to connect up the cold collectors 22a, 22b, 22c.

Under normal operating conditions, all the fluid heated by the heat generator 21 successively passes through various "loops" or assemblies constituted by a hot collector, an exchanger, a blower, a cold collector and a return to the generator.

The device illustrated comprises only three "loops" but this number is given by way of example only. As a matter of fact it may be varied and is determined by the characteristics of the device.

If a blower fails, a flow which is slightly less than the normal flow continues to pass therethrough as a result of the drive provided by the other blowers. The by-pass conduit 31 nevertheless lessens the charge losses when passing through the blower and facilitates the stopping thereof.

If an exchanger, 25a for example, is damaged, it may be excluded from the circuit by means of valve 27. The hot collector 23a is then connected to the other exchangers, for example, by opening the valve 29 to exchanger 25b, while the cold collector 22b is connected to the cold collector 22c by opening a valve 34. Such an operation makes it possible to continue to absorb the heat while stopping the operation of the generator.

In the case of a leakage at any given point in the device, the leakage flow is decreased in relation to the device shown in FIGURE 1. As a matter of fact, when a large failure occurs, for example between the hot collector 23c and the exchanger 25c, the fluid which at that moment is located, for example, in the generator between the collectors 22b and 23b should pass through a large number of apparatus before passing out into the open atmosphere; consequently charge losses occur which limit the value of the leakage flow. This flow may be reduced to a very small amount by increasing the number of loops. As a matter of fact, the greater the number of loops the smaller the flow which normally passes through each one thereof, the greater the charge losses per loop for a given leakage flow and the greater the number of devices through which a molecule of liquid has to pass on an average when a leak occurs. The danger of mechanical damage will therefore be considerably reduced. It is possible, moreover, to use this device easily in a power nuclear reactor having a number of loops such that the fluid remaining in the case of leakage is, in most cases, sufficient to enable the nuclear reactor to be stopped.

The various hot collectors are generally all at the same temperature, as are the cold collectors but zones of different temperatures may be created provided that the flow per loop always remains the same.

According to a particular embodiment, a balancing conduit 35, provided with valves 36 interconnects all the blowers, downstream of the exchangers. Moreover, valves 37 provided in conduits 24a, 24b, 24c between the exchangers and the conduit 35 enable the blower of a "loop" to be operated even if the heat exchanger of said loop is stopped.

It may also be desirable that the power of the reactor be not decreased when a blower is stopped. One solution lies in causing the blowers to operate normally at only a fraction of their possible power and to accelerate, in the case of failure of one of them, those remaining in operation. In the case shown in FIGURE 2 for example, the blowers would be normally regulated so that each yields the nominal flow with an over-pressure equal to two-thirds of the possible overpressure for the same flow. This result may be further improved by arranging additional blowers in series on certain loops.

In FIGURE 3, such an embodiment has been diagrammatically shown wherein two blowers 26a and 38 are arranged in series between the exchanger 25a and the cold collector 22b the second loop being provided with only one blower 26b.

It is obvious that the blowers will be regulated so that they never produce an unstable flow caused by the so-called "pumping" effect.

According to another embodiment, when the time required to increase the power of the blower and its motor is relatively short, it may be sufficient to have a relief blower which is not being used but which may, if required, be kept at the right temperature. The assembly illustrated in FIGURE 4 could then be used. The inlet of the relief blower 39 is connected to the inlet of blowers 26a and 26b by conduits 40 and 41 provided with valves and the outlets thereof are connected by conduits 42 and 43, also provided with valves. If the blower 26a, for example, fails the relief blower 39 is set in operation and valves 40 and 42 are opened.

Other modifications may also be made to the preferred embodiments of the invention which are described by way of non-limiting example without thereby departing from the scope of the invention.

The heat generator is preferably the core of a power nuclear reactor and, in particular, a reactor such that the various heating zones of the core may easily withstand different pressures; it is thus of the so-called "pressure tube" type wherein each active channel is contained in a strong tube under full pressure of the cooling fluid; it is obvious that the heat removal system which is the object of the invention may be used with generators of any suitable type.

What I claim is:

1. Heat removal system for a heat generator comprising a heat generator, a unitary volume of cooling fluid for said generator, a plurality of first collectors for said cooling fluid, a plurality of second collectors corresponding in number to the number of said first collectors for said cooling fluid heated in said heat generator, fluid flow conduit means within said heat generator each connecting one of said first collectors to one of said second collectors, pipes outside of said heat generator, each of said pipes connecting one of said second collectors to one of said first collectors other than the one of said first collectors to which said second collector is connected in said heat generator, a heat exchange device connected in each of said pipes for removing heat from said fluid and means for circulating said fluid at substantially uniform pressure to said first collectors, said means being connected in said pipes downstream of each of said heat exchange devices whereby said cooling fluid is at a substantially uniform temperature and pressure in said first collectors before entrance into said heat generator, which uniform temperature is lower than the temperature in said heat generator, and the temperature of said fluid in said second collectors is substantially uniform.

2. A heat removal system as claimed in claim 1, wherein each pipe is provided with at least one valve to isolate said heat exchanger connected therein.

3. A heat removal system as claimed in claim 1, wherein each pipe includes a branch by-passing the associated one of said circulating means.

4. A heat removal system as claimed in claim 1, wherein said circulating means consists of a pump for the fluid in each pipe, between the heat exchange device and the first collector.

5. A heat removal system as claimed in claim 1, wherein said circulating means consists of a blower for the fluid in each pipe, between the heat exchange device and the first collector.

6. A heat removal system as claimed in claim 1, wherein said second collectors are connected by a pipe and valves in said last named.

References Cited by the Examiner

UNITED STATES PATENTS

| | | | |
|---|---|---|---|
| 2,794,625 | 6/1957 | Sealey | 165—108 |
| 2,947,522 | 2/1960 | Keller | 165—103 X |
| 2,975,770 | 3/1961 | Monson | 122—33 |
| 3,007,681 | 11/1961 | Keller | 165—103 X |

FOREIGN PATENTS

| | | |
|---|---|---|
| 564,347 | 2/1958 | Belgium. |
| 1,239,164 | 7/1960 | France. |
| 864,136 | 3/1961 | Great Britain. |

KENNETH W. SPRAGUE, *Primary Examiner.*

FREDERICK L. MATTESON, JR., *Examiner.*

CHARLES SUKALO, *Assistant Examiner.*